UNITED STATES PATENT OFFICE.

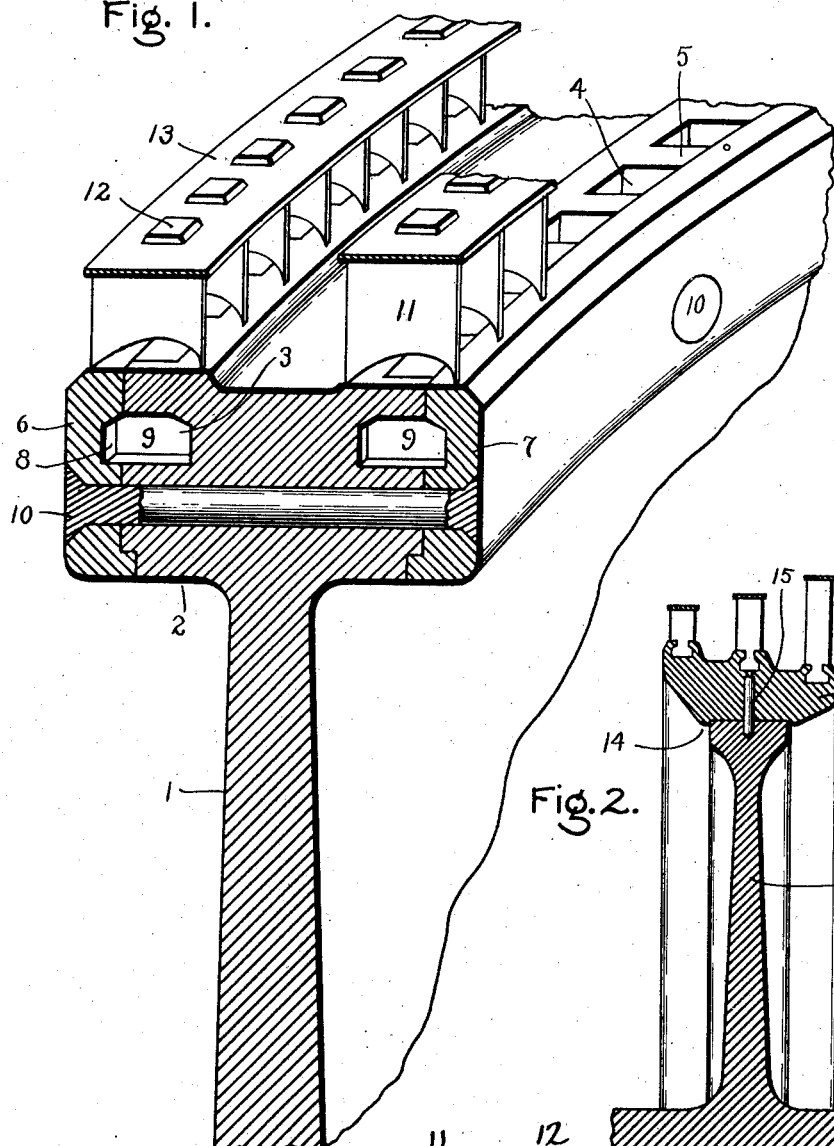
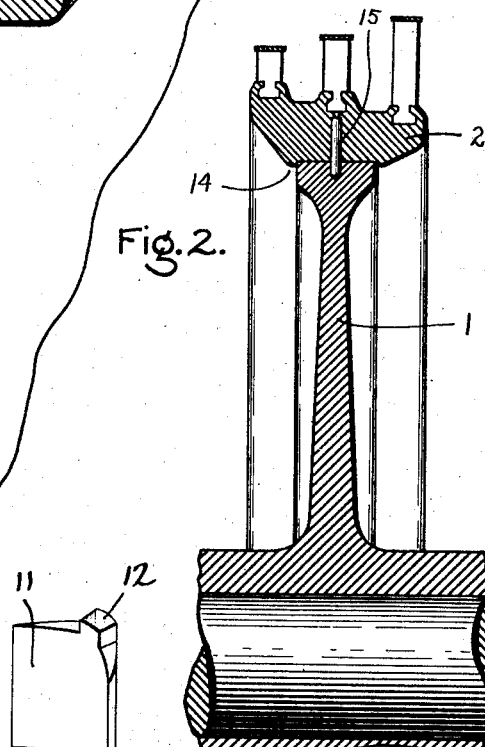
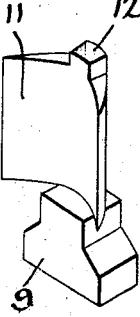

CHARLES H. WORSEY, OF LYNN, MASSACHUSETTS, ASSIGNOR TO GENERAL ELECTRIC COMPANY, A CORPORATION OF NEW YORK.

BUCKET-WHEEL FOR TURBINES.

No. 905,487.          Specification of Letters Patent.         Patented Dec. 1, 1908.

Application filed May 16, 1907. Serial No. 374,015.

*To all whom it may concern:*

Be it known that I, CHARLES H. WORSEY, a citizen of the United States, residing at Lynn, county of Essex, State of Massachusetts, have invented certain new and useful Improvements in Bucket-Wheels for Turbines, of which the following is a specification.

The present invention relates to bucket wheels for elastic fluid turbines, and has for its object to improve their construction.

For consideration of what I believe to be novel and my invention, attention is called to the accompanying specification and claims appended thereto.

In the accompanying drawing, which is illustrative of my invention, Figure 1 is a view partly in section of a bucket wheel; Fig. 2 is an axial section of part of a bucket wheel wherein the rim is separable from the web, and Fig. 3 is a perspective view of one of the buckets.

1 indicates the web of the wheel having a rim 2. This rim is provided with a finished periphery and side faces. In the side faces of the rim are grooves 3 and radial slots 4, a slot being provided for each bucket. Between the slots are projections 5 that act as spacing devices to hold the buckets in fixed relation, thereby doing away with individual and removable spacing blocks commonly in use. By using projections 5 for spacing purposes instead of detachable blocks I save a considerable amount of machine work, and at the same time, decrease the labor of mounting the buckets on the wheel. These projections may be on the rim or on the rings adjacent thereto. With this construction, there is also less danger of the buckets working loose, or if one bucket should get loose it would not affect the others. Situated on opposite sides of the rim are rings 6 and 7, which may be made in segments or not as desired. These rings are provided with recesses 8 that register with and form a part of grooves 3 to receive the base 9 of the buckets. The walls of the grooves 3 may have any suitable shape, and the bases 9 of the buckets should make a snug fit therein. The rings 6 and 7 are secured to the rim of the wheel by axially extending rivets 10. Each bucket is provided with a shank that passes upward through the slot 4 and connects the base portion with the main body portion of the bucket, the latter having a curved working face 11 against which the motive fluid strikes. The top of each bucket is provided with a tenon 12 which passes through a suitable opening in the cover or baffling strip 13 to secure the latter in place. The buckets may be made of any suitable material, and may be made in any desired manner.

In assembling the buckets in place on the wheels, the latter will be placed on a suitable support and the buckets inserted one after the other in the radial slots 4, after which one of the rings is mounted in place, and the rivets 10 passed through the rim. After one complete row of buckets is mounted in place, work is started on the other side of the wheel and the same operation is repeated. After all of the buckets are in place the last ring, or the segments thereof, is mounted in place and the rivets 10 are riveted over at the ends to secure the parts in place.

It sometimes happens that the steel castings for forming the web and rim are defective in that they have blow-holes which are only discernible after the wheel has been largely finished. It is not at all uncommon to be obliged to reject a large percentage of the castings in a given lot owing to imperfections. Some of these imperfections, of course, can be detected before any machine work is done on the wheel, and in other cases not. It has come to my attention that sometimes the work on a wheel will so far progress that it is completed with the exception of turning one of the bucket receiving grooves, when a defect will be discovered of such a serious character as to cause the rejection of the wheel. I aim to reduce the losses due to defective castings in so far as it is possible, by making the wheel in two principal parts, the web and hub forming one part and the rim the other, the latter being shrunk on the web. Such a construction is shown in Fig. 2 wherein 1 indicates the wheel web and 2 the detachable rim which is provided with small shoulders 14 for holding the rim against axial movement on the web. These shoulders are slightly exaggerated in size for the purpose of illustration. They should be of such size that the rim when heated can be slipped over the wheel web, and when cooled, will lock the rim and web with respect to each other in so far as axial movement is concerned. Ordinarily, the rim will shrink when cooled by an amount sufficient to securely hold the parts together, but in order to avoid any tendency of the parts to slip one with respect to the other in case the rim becomes unduly heated in service, I provide one or more radially extending pins 15 which pass down through one of the bucket receiving grooves and enter the periphery of the wheel. In the present embodiment of the invention, the rim is provided with three bucket receiving grooves or channels which may be of the construction previously described or, in so far as the feature of a removable rim is concerned, of any other suitable type. I prefer, however, to use the arrangement set forth in connection with Fig. 1.

By reason of the construction shown I avoid all distortion of the metal of which the buckets are composed, which distortion would have a tendency to weaken them. The construction is further so simple that the buckets can be assembled on the wheel by relatively unskilled persons and with a minimum amount of labor.

The invention is shown in connection with a parallel flow turbine but it is not limited thereto in all respects.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A wheel for elastic fluid turbines comprising a rim having a circumferential groove, buckets, the bases of which are located in the groove and are held by the walls thereof, and projections forming a part of the wheel that extend between the buckets and serve as spacers therefor.

2. A wheel for elastic fluid turbines comprising a rim having a circumferential groove, a member secured to the rim and containing a recess which registers with and forms a part of the groove, buckets, the bases of which are located in the groove and are held by the walls thereof, and projections that extend between the rim and the member to form spaces for the buckets and are integral with one of said parts.

3. A wheel for elastic fluid turbines comprising a rim having grooves in its side faces, members secured to said faces and containing recesses that register with and form parts of the grooves, buckets arranged in rows, the bases of which are located in the groove and are held by the walls thereof, and projections that extend between the rim and members and act as spacers for the buckets, the said projections being integral with one of said parts.

4. A wheel for elastic fluid turbines comprising a rim having a groove and also projections with slots between, a member that engages the projections and has a recess which registers with the groove and forms a part thereof, buckets arranged in a row, the bases of which enter the groove, are held by the walls thereof and extend between the projections, and means for uniting the said member and the rim.

5. A wheel for an elastic fluid turbine comprising a web having a hub and a finished peripheral surface, a rim that is shrunk on the web, buckets arranged in a row, and means on the rim for securing the buckets in place.

6. A wheel for an elastic fluid turbine comprising a web having a hub and a finished peripheral surface, a rim that is shrunk on the web, means for preventing the rim from moving axially on the web when slightly expanded by heat, buckets arranged in a row, and means on the rim for securing the buckets in place.

7. A wheel for elastic fluid turbines comprising a rim having a circumferential groove, radially extending projections with slots between that communicate with the groove, buckets which are slipped into the groove and slots by an axial movement, and a means common to a plurality of buckets which is applied to the side of the wheel for securing the buckets in place.

In witness whereof, I have hereunto set my hand this fourteenth day of May, 1907.

CHARLES H. WORSEY.

Witnesses:
   JOHN A. MCMANUS, Jr.,
   PHILIP F. HARRINGTON.